(12) United States Patent
Broy et al.

(10) Patent No.: US 12,444,388 B2
(45) Date of Patent: Oct. 14, 2025

(54) DISPLAY DEVICE FOR A DRIVING SYSTEM FOR AUTOMATED DRIVING FOR DISPLAYING THE ACTIVE AUTOMATED DRIVING MODE

(71) Applicant: Bayerische Motoren Werke Aktiengesellschaft, Munich (DE)

(72) Inventors: Nora Broy, Munich (DE); Julian Eichhorn, Menlo Park, CA (US); Sebastian Hergeth, Munich (DE); Philipp Kerschbaum, Munich (DE); Hermann Kuenzner, Freising (DE); Frederik Platten, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 201 days.

(21) Appl. No.: 16/754,259

(22) PCT Filed: Dec. 5, 2018

(86) PCT No.: PCT/DE2018/100993
§ 371 (c)(1),
(2) Date: Apr. 7, 2020

(87) PCT Pub. No.: WO2019/110056
PCT Pub. Date: Jun. 13, 2019

(65) Prior Publication Data
US 2020/0273429 A1    Aug. 27, 2020

(30) Foreign Application Priority Data
Dec. 7, 2017 (DE) .................. 10 2017 222 167.4

(51) Int. Cl.
*G09G 5/10* (2006.01)
*B60K 35/10* (2024.01)
(Continued)

(52) U.S. Cl.
CPC ............... *G09G 5/10* (2013.01); *B60K 35/10* (2024.01); *B60K 35/28* (2024.01); *B60K 35/29* (2024.01);
(Continued)

(58) Field of Classification Search
CPC ............. B60K 35/00; B60K 2370/175; B60K 2370/349; B60K 2370/782; G06F 3/013; G09G 5/003
See application file for complete search history.

(56) References Cited

U.S. PATENT DOCUMENTS

2003/0075972 A1*  4/2003  Schuck ................... B60T 13/08
                                                                    303/7
2012/0325045 A1* 12/2012  Pekari .................... B62D 1/046
                                                                    74/552
(Continued)

FOREIGN PATENT DOCUMENTS

DE     10 2011 112 134 A1    3/2013
DE       102012000864 A1 *   5/2013  ........... B60Q 1/0041
(Continued)

OTHER PUBLICATIONS

International Search Report (PCT/ISA/210) issued in PCT Application No. PCT/DE2018/100993 dated Mar. 18, 2019 with English translation (five (5) pages).
(Continued)

Primary Examiner — Grace Q Li
(74) Attorney, Agent, or Firm — Crowell & Moring LLP

(57) ABSTRACT

For automated driving, a driving system can be operated at least in a first automated driving mode with automated longitudinal and/or transverse guidance. A display device includes a driving mode display with a lighting unit. The driving mode display corresponds to a steering wheel display with a light strip structure for the steering wheel rim
(Continued)

that can be lit up. A control device coupled to the display is also provided, for controlling the display. The control device is designed to control the driving mode display such that, upon activation of the first automated driving mode, the lighting unit lights up in a first lighting state with a specific luminous intensity, so as to indicate the activation of the first automated driving mode to the driver. The driving mode display is controlled such that, following the activation of the first automated driving mode, with the first driving mode still active, the lighting unit is operated in a dimmed lighting state as compared to the first lighting state, with a reduced luminous intensity in relation to the luminous intensity of the first lighting state.

20 Claims, 5 Drawing Sheets

(51) Int. Cl.
  *B60K 35/22*   (2024.01)
  *B60K 35/28*   (2024.01)
  *B60K 35/29*   (2024.01)
  *B60K 35/60*   (2024.01)
  *B60K 35/81*   (2024.01)
  *B62D 1/06*    (2006.01)
  *G06F 3/01*    (2006.01)
  *G09G 5/00*    (2006.01)

(52) U.S. Cl.
  CPC .............. *B60K 35/60* (2024.01); *B60K 35/81* (2024.01); *B62D 1/06* (2013.01); *G06F 3/013* (2013.01); *G09G 5/003* (2013.01); *B60K 35/22* (2024.01); *B60K 2360/175* (2024.01); *B60K 2360/349* (2024.01); *B60K 2360/782* (2024.01); *G09G 2320/0626* (2013.01); *G09G 2354/00* (2013.01); *G09G 2380/10* (2013.01)

(56) References Cited

U.S. PATENT DOCUMENTS

| | | | |
|---|---|---|---|
| 2014/0328077 A1 | 11/2014 | Tovar et al. | |
| 2015/0175106 A1 | 6/2015 | Frommann et al. | |
| 2016/0185387 A1 | 6/2016 | Kuoch | |
| 2017/0057402 A1* | 3/2017 | Uesugi | B60Q 1/12 |
| 2017/0120749 A1* | 5/2017 | Dias | G08B 21/06 |
| 2017/0120811 A1* | 5/2017 | Salter | B60R 7/02 |
| 2018/0093675 A1* | 4/2018 | Holub | B60W 50/14 |
| 2018/0134116 A1* | 5/2018 | Chen | B60H 1/00964 |
| 2020/0262452 A1* | 8/2020 | Nagashima | G08G 1/20 |
| 2020/0269747 A1* | 8/2020 | Kusayanagi | B60K 35/00 |

FOREIGN PATENT DOCUMENTS

| | | | |
|---|---|---|---|
| DE | 10 2012 206 030 A1 | 10/2013 | |
| DE | 10 2013 012 779 A1 | 2/2015 | |
| DE | 10 2013 021 644 A1 | 6/2015 | |
| DE | 10 2014 009 595 A1 | 12/2015 | |
| EP | 2 960 111 B1 | 6/2018 | |
| EP | 2 836 386 B1 | 5/2019 | |
| JP | 4013562 B2 * | 11/2007 | B60Q 3/80 |

OTHER PUBLICATIONS

German-language Written Opinion (PCT/ISA/237) issued in PCT Application No. PCT/DE2018/100993 dated Mar. 18, 2019 (five (5) pages).

German-language Search Report issued in German Application No. 10 2017 222 167.4 dated Sep. 21, 2018 with partial English translation (14 pages).

* cited by examiner

DISPLAY DEVICE FOR A DRIVING SYSTEM FOR AUTOMATED DRIVING FOR DISPLAYING THE ACTIVE AUTOMATED DRIVING MODE

BACKGROUND AND SUMMARY OF THE INVENTION

The invention relates to a display device for a driving system for automated driving for a motor vehicle, which display device comprises a driving mode display for a vehicle cockpit with a lighting unit, in particular with a steering wheel display with luminous strip structure. Furthermore, the invention relates to a display device for a driving system for automated driving which uses a driving mode display of this type.

In the context of this document, the term "automated driving" is understood to mean driving with automated lateral or longitudinal control, preferably with automated longitudinal and lateral control. Automated driving involves for example driving for a long time on the interstate, preferably with automated lateral and longitudinal control.

The term "automated driving" encompasses automated driving with an arbitrary degree of automation. Exemplary degrees of automation are assisted, partly automated, highly automated or fully automated driving. These degrees of automation were defined by the German Federal Highway Research Institute (BASt) (see BASt publication "Research compact", issue November 2012). In the case of assisted driving, the driver permanently carries out the longitudinal or lateral control, while the system performs the respective other function within certain limits. In the case of partly automated driving (PAD), the system performs the longitudinal and lateral control for a certain period of time and/or in specific situations, wherein the driver must permanently monitor the system as in the case of assisted driving. In the case of highly automated driving (HAD), the system performs the longitudinal and lateral control for a certain period of time, without the driver having to permanently monitor the system; however, the driver must be able to take over control of the vehicle within a certain time. In the case of fully automated driving (FAD), the system can automatically manage driving in all situations for a specific application; the driver is no longer required for this application. The four degrees of automation mentioned above correspond to SAE levels 1 to 4 of the SAE J3016 standard (SAE—Society of Automotive Engineering). By way of example, highly automated driving (HAD) corresponds to level 3 of the SAE J3016 standard. Furthermore, the SAE J3016 also provides SAE level 5 as the highest degree of automation, which is not contained in the definition by the BASt. SAE level 5 corresponds to driverless driving, wherein the system can automatically manage all situations like a human driver during the entire journey; a driver is generally no longer required.

It is known from the prior art to indicate the state of a driving system for automated driving by way of the luminous state of a luminous strip, for example in the form of a string of LED illuminants (LED—light-emitting diode), said luminous strip preferably being integrated in the steering wheel rim. If the driver activates automated driving, the active state of the driving system is indicated to said driver by way of the luminous steering wheel rim which lights up in blue, for example. In this regard, the document DE 10 2011 112 134 A1 discloses a steering wheel, the steering wheel rim of which has light sources. The light sources of the steering wheel rim are activated when the autonomous driving mode of the vehicle is activated. The document DE 10 2013 012 779 A1 describes the use of an arcuate lighting unit in the steering wheel rim for optically signaling the activation of an automatic driving mode. After the activation of the autonomous driving mode, the steering wheel rim lights up green, for example.

In the case of such display devices known from the prior art, the state of the automation of the vehicle can thus be indicated for example by way of a luminous strip in the steering wheel rim. If the driver activates a driving function for automated driving, the active state of this driving function is indicated to the driver by way of the luminous steering wheel rim.

The luminous steering wheel rim may disturb the driver during a relatively long journey with automation of the driving task. By way of example, during highly automated or fully automated driving, the driver can devote himself/herself to some other activity detached from driving, e.g. viewing a screen, which is preferably situated in the cockpit, in order for example to watch a film, to handle emails or to retrieve information from the Internet. It is precisely if the driver would like to devote himself/herself to some other activity that the permanent emission of light by the steering wheel rim during the automated driving mode can have a considerable adverse effect on the driver in the course of the other activity.

It is an object of the invention for the driver to be disturbed to a lesser extent by the luminous display for displaying the active driving mode during the journey.

This object is achieved by means of the features of the independent patent claims. Advantageous embodiments are described in the dependent claims. It is pointed out that additional features of a patent claim dependent on an independent patent claim without the features of the independent patent claim or only in combination with a subset of the features of the independent patent claim can form a dedicated invention which is independent of the combination of all features of the independent patent claim and which can be made the subject of an independent claim, of a divisional application or of a subsequent application. This is applicable in the same way to technical teachings which are described in the description and which can form an invention independent of the features of the independent patent claims.

A first aspect of the invention relates to a display device for a driving system for automated driving of a motor vehicle. For automated driving, the driving system is the driving system operable at least in a first automated driving mode with automated longitudinal and/or lateral control. By way of example, the first driving mode is a driving mode for partly automated, highly automated or fully automated driving. The driving system preferably supports a plurality of driving modes having a different degree of automation, e.g. a partly automated driving mode and a highly automated driving mode.

The display device comprises a driving mode display (for the vehicle cockpit) with a lighting unit. The driving mode display preferably corresponds to a steering wheel display with a light-emitting luminous strip structure for the steering wheel rim, wherein the lighting unit corresponds to the luminous strip structure.

The luminous strip structure can correspond to a closed ring, an upwardly open ring, a left and right luminous strip in the left and right part, respectively, of the steering wheel rim, or a luminous strip only in the upper part of the steering wheel rim.

The luminous strip structure preferably comprises one or more groups of a plurality of illuminants, for example LED illuminants, which are arranged next to one another and which can emit light at least in a common luminous color, e.g. blue, depending on actuation. The luminous strip structure comprises, for example, a group of illuminants which are arranged next to one another and which extend in the form of a closed ring over the entire angular range of the steering rim, which extend in the form of a ring open at one point over a large angular range of the steering wheel rim or which form a luminous strip in the upper region of the steering wheel rim. Alternatively, provision can be made for the luminous strip structure to comprise two groups of illuminants, e.g. a left luminous strip for a left region of the steering wheel rim with a first group of illuminants situated next to one another and a right luminous strip for a right region of the steering wheel rim with a second group of illuminants situated next to one another.

Furthermore, provision is made of a control device for controlling the display, said control device being coupled to the display. The control device is configured to control the driving mode display in such a way that, in the context of the activation of the first automated driving mode, the lighting unit is luminous in a first luminous state with a specific light intensity in order to indicate the activation of the first automated driving mode to the driver. By way of example, the luminous strip structure is luminous in the first luminous state in a predefined luminous color assigned to the first automated driving mode, e.g. blue, with the specific light intensity, e.g. with the maximum possible luminous intensity.

The display device is characterized in that the control device is furthermore configured to control the driving mode display in such a way that after the activation of the first automated driving mode, with the first driving mode still active, the lighting unit is operated in a dimmed luminous state in comparison with the first luminous state, with a reduced light intensity relative to the light intensity of the first luminous state. Preferably, the luminous color remains identical in this case, that is to say that in the dimmed state the lighting unit is luminous in the same luminous color as in the first luminous state.

By virtue of the fact that the lighting unit is dimmed into the dimmed luminous state after activation, the driver is not disturbed by the lighting unit during the automated travel in the first automated driving mode. Furthermore, the reduction in the light intensity subsequently enables a high light intensity swing for a later increase in the light intensity in order to attract the driver's attention as necessary, for example in the case of a change (e.g. changeover) of the automated driving mode or in the case of a takeover request on the part of the system for the driving task to be taken over manually by the driver.

The control device is preferably configured (after the activation of the automated driving mode) to dim the light intensity after a predefined time duration has elapsed. In order not to disturb the driver with the permanently luminous steering wheel rim during automated travel, the luminosity of the lighting unit (e.g. the luminous strip) is dimmed preferably shortly after the activation of the first driving mode, for example after a predefined time duration in the range of 3 to 30 s has elapsed (e.g. after 10 s).

As a point in time for the beginning of the predefined time duration, it is possible to take into account for example the point in time of the detection of the activation action by the driver for activating the first driving mode, or alternatively the later point in time from which the first automated driving mode is then actually active and has taken over the driving task. Alternatively, it is also possible to take into account the point in time for the beginning of the predefined time duration, from which the increase in the light intensity upon activation of the driving mode was ended.

Alternatively, it would also be conceivable to trigger the dimming of the luminous intensity after a predefined driving distance (e.g. 1 km) traveled.

In order to reduce the light intensity of a lighting unit constructed from individual illuminants (in particular LED illuminants), the light intensity of the individual illuminants can be reduced in each case. Alternatively, it is also possible to reduce the number of luminous illuminants (with the light intensity of the still luminous illuminants otherwise remaining the same) (for example, only every n-th illuminant, e.g. every second or third illuminant, is still luminous after dimming).

The light intensity of the dimmed luminous state is preferably variable. By way of example, the light intensity of the luminous state to which the lighting unit is firstly dimmed after the activation of the first driving mode is accordingly variable. The fact that the light intensity of the dimmed luminous state is variable can also mean that the dimmed light intensity of the lighting unit, once dimming has already been concluded, can vary over time depending on one or more influencing flow factors (this luminous state is also understood as a dimmed luminous state). Preferably, the target light intensity directly after the conclusion of the dimming process is dependent on one or more influencing factors and also the dimmed light intensity is dependent on said one or more influencing factors over time.

Dependence of the light intensity of the dimmed luminous state on one or more influencing factors as outlined below may relate to the target luminosity value of the initial dimming process and/or the variability of the luminosity over the course of time.

The light intensity in the dimmed state can depend on the prevailing lighting conditions, for example. In this respect, the control device can receive brightness information which is related to the ambient brightness, in particular is characteristic thereof. By way of example, the brightness information can be obtained from the signal of an optical sensor (for example camera or dedicated brightness sensor) integrated in the vehicle or fitted outside the vehicle. However, the brightness information can also be information which can be used to estimate the brightness only indirectly (for example the time of day).

The control device controls the lighting unit depending on the brightness information such that the light intensity of the dimmed luminous state is higher in the case of increased brightness (e.g. high insolation) than in the case of lower brightness compared with the increased brightness (e.g. lower insolation, travel through a tunnel).

This is based on the insight that in the case of lower ambient brightness a lower light intensity of the lighting unit than higher ambient brightness in comparison therewith is already able to be perceived well by the driver; the light intensity of the dimmed luminous state can thus be chosen to be lower as ambient brightness decreases without restriction of the perceptibility of the light signal.

The control device preferably also evaluates where the driver is looking, and sets the magnitude of the dimmed light intensity depending on this. For this purpose, the control device receives gaze information about where the driver's gaze is directed. The control device controls the light intensity of the dimmed luminous state depending on the gaze information. The gaze information can be determined by means of an interior camera together with associated evaluation.

The dimmed light intensity can be lower, for example, if the driver is looking directly at a steering wheel comprising the steering wheel display (or is looking directly next to it) compared with if the steering wheel is in the peripheral area of the driver's field of view or is no longer in the driver's field of view at all. Specifically, if the driver is looking at the steering wheel, a very low light intensity suffices (if this is permitted by the ambient brightness) for sufficient perceptibility of the information conveyed by way of the steering wheel display.

Therefore, the control device is preferably configured to control the steering wheel display depending on the gaze information such that the light intensity of the dimmed luminous state is lower when the driver's gaze is directed toward the steering wheel compared with when the driver's gaze is directed toward viewing points remote from the steering wheel (which viewing points exceed a specific distance from the steering wheel for example in the field of view).

By way of example, the field of view which can be looked at by the driver can be subdivided into a plurality of defined viewing regions. The viewing regions comprise for example a first viewing region comprising at least the steering wheel with the luminous strip structure. By way of example, said first viewing region furthermore comprises viewing points toward the traffic situation ahead, said viewing points lying above the steering wheel, for example. Furthermore, a second viewing region is defined, which at least partly (in particular completely) surrounds the first viewing region. The control device is configured to control the steering wheel display depending on the gaze information such that the light intensity of the dimmed luminous state is lower when the driver's gaze is directed toward the first viewing region compared with when the driver's gaze is directed toward the second viewing region.

A further influencing factor for the the light intensity of the dimmed luminous state can be the driver's activity. In this respect, the control device receives activity information about the driver's activity. The light intensity of the dimmed luminous state is then dependent on the activity information. The dimming is thus oriented toward the driver's activity. If the driver is currently occupied for example with an activity in the CID (central information display) of the cockpit (e.g. with watching a film), the driving mode display is dimmed to an even greater extent, for example, in order not to disturb the driver during his/her activity. Preferably, the activity information comprises information about whether the driver is viewing a screen situated in the vehicle. If it is established that the driver is looking at a screen, for example the light intensity in the dimmed luminous state (with otherwise identical boundary conditions) is lower than if the driver is not looking at the screen.

If the light intensity is dimmed, a circumstance may occur on account of which the light intensity (with the luminous color preferably remaining the same) is increased again, for example to the light intensity of the first luminous state directly upon activation of the first driving mode.

By way of example, in connection with a current or imminent takeover request for taking over the driving task, the light intensity of the lighting unit can be increased. In reaction to the driving task being taken over by the driver, the light intensity of the lighting unit can then be reduced again.

If the vehicle is in the manual driving mode and it is established that an automated driving mode is available for activation (e.g. highly automated driving), for example because a roadway approved for the automated driving mode (e.g. interstate or travel along a specific section of an interstate) is now being traveled, the driver is informed about the availability of the automated driving mode by way of the lighting unit in order that the driver can activate the driving mode. If the lighting unit was not luminous beforehand, the lighting unit is activated in order to inform the driver about the availability in the luminous color (e.g. blue) assigned to the driving mode, preferably with high light intensity.

If, before the activation of an automated driving mode, for example highly automated driving, the vehicle is in a different automated driving mode with a lower degree of automation (e.g. partly automated driving or assisted driving) and the lighting unit was already luminous (e.g. in green) anyway in order to indicate the previous driving mode, and if it is established that this driving mode hitherto not active is available for activation, the light intensity can be increased in order to signal the availability to the driver. In order to give the driver an indication of the availability of this driving mode by way of the luminous color, too, it is possible (in addition to increasing the luminous intensity) to change the luminous color to a luminous color assigned to the driving mode now available (e.g. from green to blue blue), wherein this change of the luminous color is then automatically reversed again shortly afterward if the driver has not accepted the offer to activate the driving mode. Alternatively, it is also possible, before upon availability of the driving mode, for one portion of the illuminants momentarily to emit light in the luminous color (e.g. blue) assigned to the activatable driving mode, while another portion of the illuminants emits light (e.g. green) assigned to the current driving mode. By way of example, for this purpose, in the case of a steering wheel display having a light-emitting luminous strip structure in the steering wheel rim, it is possible to lengthen the luminous regions of the luminous strip structure in a luminous color assigned to the first driving mode, such that the luminous strip structure emits light partly in the luminous color of the hitherto active driving mode and partly in the luminous color of the available driving mode.

If the driver would like to take over driving again from an automated driving mode or the system requests the driver to take over the driving task, preferably a previously dimmed light intensity of the lighting unit, for example of a luminous strip structure in the steering wheel rim is increased again in order to make clear the imminent change of state. The driver can for example actuate an operating element (for example a pushbutton) if, in the automated driving mode, he/she would like to take over the driving task again and wants to communicate this to the driving system. As a result, the driver experiences a system reaction to his/her input which is clearly visible to him/her.

A previously dimmed light intensity can also be increased again in the event of fatigue of the driver being ascertained.

A further aspect of the invention relates to a driving system comprising a display device described above.

A third aspect of the invention relates to a display method for displaying an activated automated driving mode for a driving system for automated driving of a motor vehicle. The driving system is operable at least in a first automated driving mode with automated longitudinal and/or lateral control. Furthermore, a driving mode display for the vehicle cockpit with a lighting unit is present. The method comprises the following steps:

controlling the driving mode display in such a way that in the context of the activation of the first automated driving mode, the lighting unit is luminous in a first luminous state with a specific light intensity in order to indicate the activation of the first automated driving mode to the driver; and after the activation of the first automated driving mode, controlling the driving mode display in such a way that, later with the first driving mode still active, the lighting unit is operated in a dimmed luminous state in comparison with the first luminous state, with a reduced light intensity relative to the light intensity of the first luminous state.

The above explanations concerning the display device of the invention in accordance with the first aspect of the invention are also applicable, mutatis mutandis, to the method according to the invention in accordance with the third aspect of the invention. Advantageous exemplary embodiments of the method according to the invention that are not explicitly described at this juncture and in the patent claims correspond to the advantageous exemplary embodiments of the display device according to the invention as described above or described in the patent claims.

The invention is described below on the basis of an exemplary embodiment with the aid of the accompanying drawings.

DETAILED DESCRIPTION OF THE DRAWINGS

Figure 1:
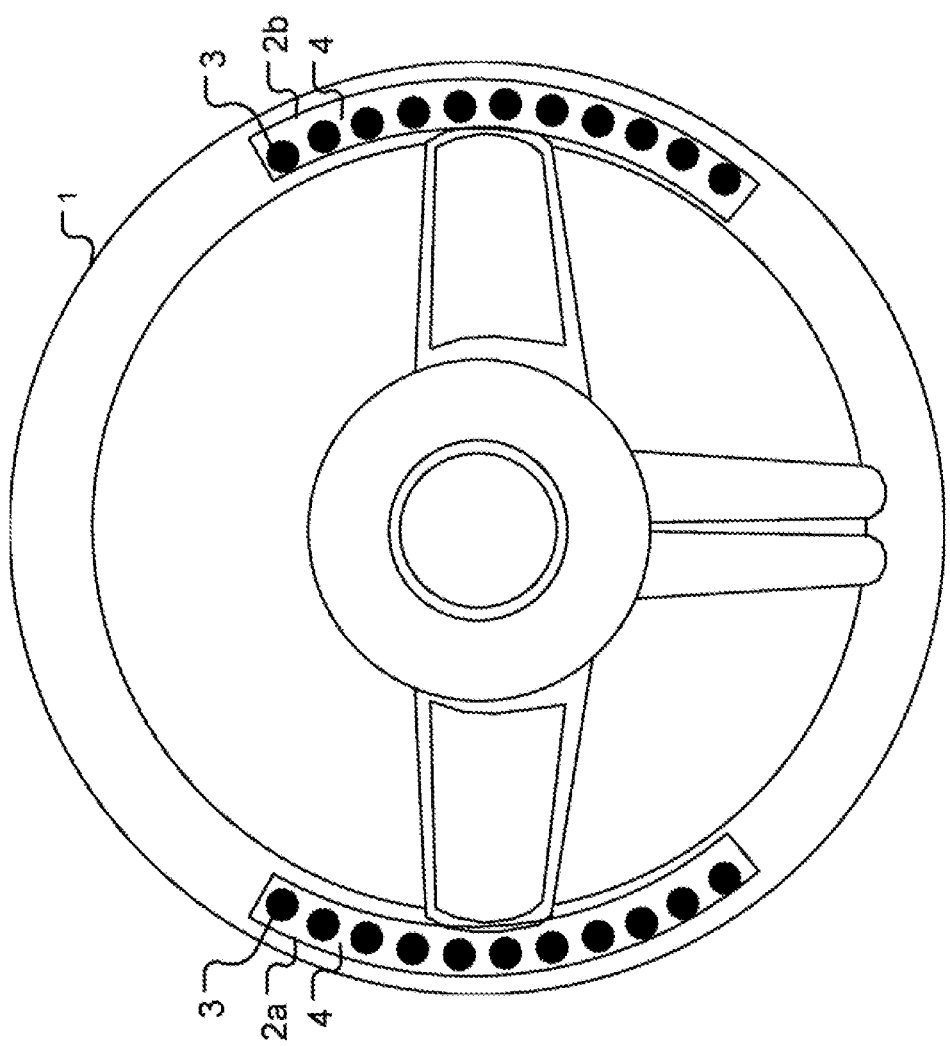
FIG. 1 shows one exemplary embodiment of a steering wheel with steering wheel display for displaying the active driving mode.

FIG. 1 illustrates one exemplary embodiment of a steering wheel 1 with a steering wheel display for displaying the active driving mode. The steering wheel display has a luminous strip structure having a left luminous strip 2a and a right luminous strip 2b, which are both integrated in the steering wheel rim. The luminous strip structure can alternatively correspond to a closed ring, an upwardly open ring or a luminous strip arranged in the upper region of the steering wheel rim.

Each luminous strip 2a, 2b comprises a string of illuminants 3 of identical type arranged next to one another. The illuminants 3 are light-emitting diodes (LEDs), for example. Each illuminant 3 can comprise one or more light-emitting diodes, for example two or three diodes, in particular in the case of an illuminant 3 which can emit light in different luminous colors.

The illuminants 3 are preferably arranged behind a light-transmissive layer 4 incorporated in the steering wheel rim, light being emitted through said layer.

The illuminants 3 can preferably be driven individually. It is advantageous if the illuminants 3 can emit light in different colors, for example in blue, yellow, green and red.

In order to reduce the light intensity of the luminous strips 2a, 2b constructed from illuminants 3, the light intensity of the individual illuminants 3 can be reduced in each case. Alternatively, for each luminous strip 2a, 2b, it is also possible to reduce the number of luminous illuminants 3 with the light intensity of the still luminous illuminants otherwise remaining the same (for example, only every n-th illuminant, e.g. every second or third illuminant, is still luminous after dimming).

Depending on distance, number of the illuminants 3 and scattering of the light, the luminous character can range from a substantially homogenous illumination in the region of the luminous illuminants 3 through to a rather loose chain of luminous points.

The steering edge pointer is part of a user interface of an exemplary driving system for automated driving. The driving system has a driving mode HAD for highly automated driving with automated longitudinal and lateral control, for example for driving on the interstate. Further driving modes with a lower degree of automation are further conceivable, for example a driving mode for partly automated driving PAD with automated longitudinal and lateral control, and also a driving mode ACC for assisted driving with automated longitudinal control. Depending on the active driving mode, the luminous strips 2a emit light in a luminous color assigned to the respectively active driving mode, e.g. blue for driving mode HAD, green in the driving mode PAD and yellow in the driving mode ACC.

Figure 2:
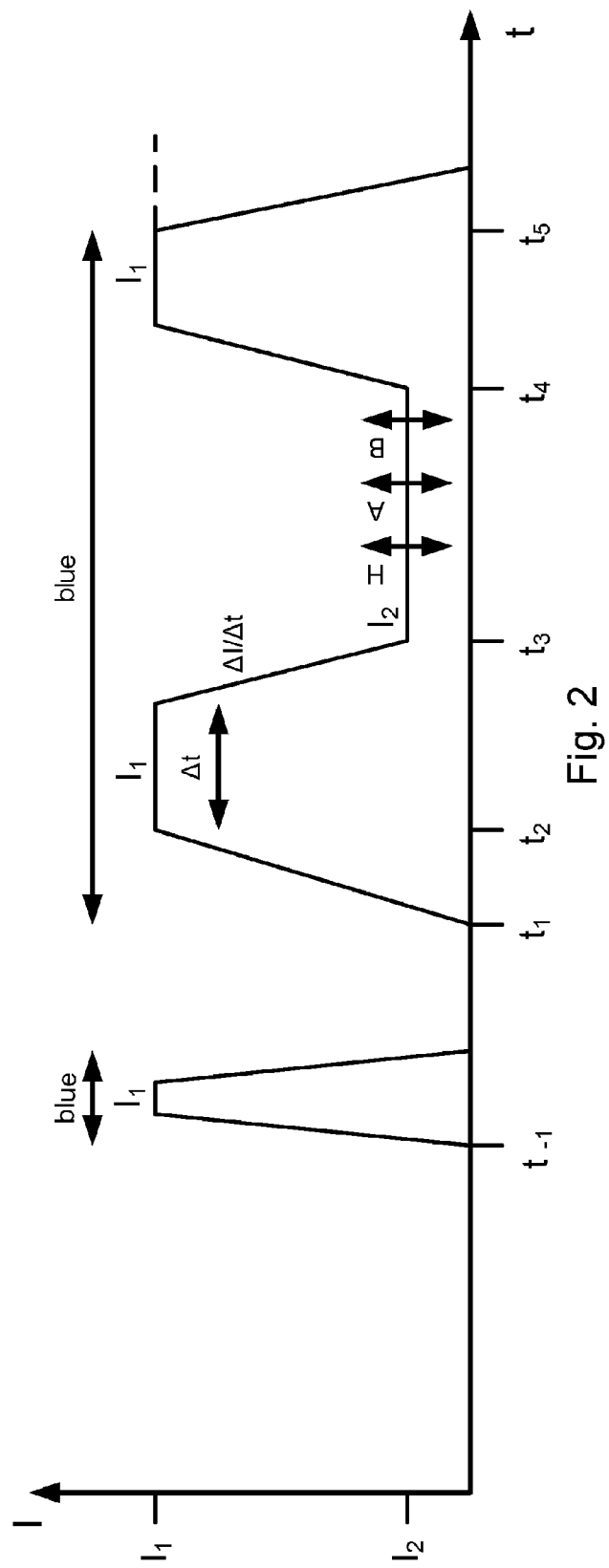
FIG. 2 shows an exemplary schematically depicted profile of the light intensity of the luminous strips of the steering wheel display over time.

The control of the steering wheel display is described below with reference to FIG. 2:

FIG. 2 shows an exemplary schematically depicted profile of the light intensity I of the luminous strips 2a, 2b of the steering wheel display over time t. The active luminous color is indicated at the top of the diagram.

It is initially assumed that directly before the point in time $t_1$ the driving system is not active and the vehicle is being controlled manually. The luminous strips 2a, 2b are initially not luminous. At the point in time $t_1$, the driver activates the driving mode HAD by way of an operating element, e.g. a pushbutton. The luminous strips 2a, 2b are activated and emit light in the color (e.g. blue) assigned to the driving mode HAD. The light intensity I increases to the target value $I_1$, which is reached at the point in time $t_2$, from which approximately the driving mode HAD is also active. The level $I_1$ is less than or equal to the maximum light intensity $I_{max}$ of the luminous strips.

After a time duration Δt (e.g. Δt=10 s) has elapsed, for example calculated from when the level $I_1$ is reached or from when the driving mode HAD is active, the luminous strips 2a, 2b are dimmed. The light intensity $I_2$ reached during dimming, starting from the point in time $t_3$, is preferably variable and may depend on a plurality of influencing factors.

The light intensity $I_2$ in the dimmed state may depend on the ambient brightness, for example. By way of example, brightness information H can be obtained from the signal of an optical sensor (for example a camera or a dedicated brightness sensor) integrated in the vehicle. The steering wheel display is controlled depending on the brightness information such that the light intensity $I_2$ of the dimmed luminous state is higher in the case of increased brightness than in the case of lower brightness compared with the increased brightness. The influence of the brightness on the light intensity $I_2$ in the dimmed state is indicated by the vertically extending arrow bearing the reference sign H in FIG. 2.

Furthermore, the light intensity $I_2$ in the dimmed state may depend on information A about the driver's activity in the vehicle. If it is established, for example, that the driver is using a screen, for example the light intensity $I_2$ in the dimmed luminous state (with otherwise identical boundary conditions) is lower. The influence of the driver's activity on the light intensity $I_2$ in the dimmed state is indicated by the vertically extending arrow bearing the reference sign A in FIG. 2.

Furthermore, where the driver is looking is evaluated in order that the magnitude of the dimmed light intensity is set depending thereon. An interior camera is used to determine where the driver's gaze is directed.

Figure 3:
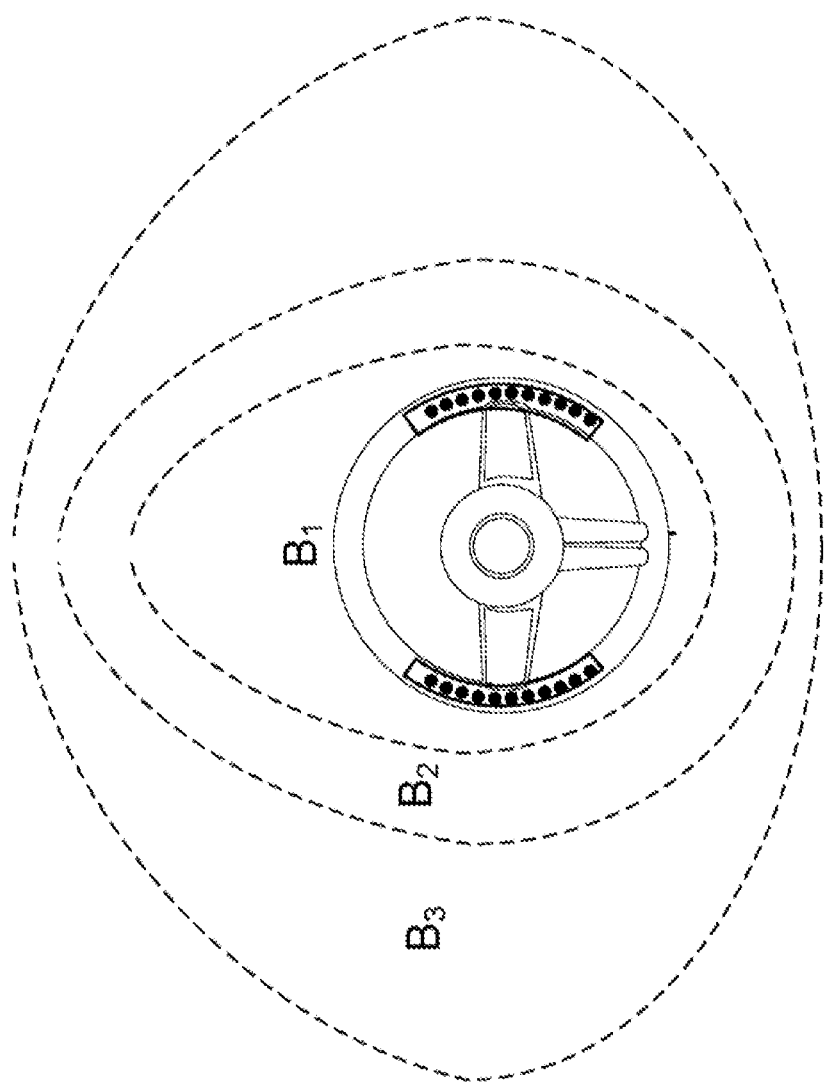
FIG. 3 shows exemplary viewing regions.

By way of example, the field of view which the driver can look at can be subdivided into a plurality of defined viewing regions $B_i$. This is depicted schematically by way of example in FIG. 3. The viewing regions comprise for example a first viewing region $B_1$ comprising at least the steering wheel 1 with the luminous strip structure. By way of example, said first viewing region $B_1$ furthermore comprises viewing points toward the traffic situation ahead through the windshield, these viewing points lying above the steering wheel from the driver's viewpoint, for example. Furthermore, a second viewing region $B_2$ is defined, which at least partly surrounds the first viewing region. The steering wheel display is controlled depending on information B about the driver's gaze such that when the driver's gaze is directed toward the first viewing region $B_1$, the light intensity $I_2$ of the dimmed luminous state is lower than when the driver's gaze is directed toward the second viewing region $B_2$. The low light intensity $I_2$ when the gaze is directed toward the first viewing region $B_1$ makes it possible to prevent the driver from being disturbed by the light despite good perceptibility of the information. When the driver's gaze is directed toward the third viewing region $B_3$ illustrated in FIG. 3, the light intensity $I_2$ of the dimmed luminous state is even higher than when the driver's gaze is directed toward the second viewing region $B_2$. The increase in the light intensity when the gaze is directed toward viewing regions $B_2$ and particularly $B_3$ that are further away from the steering wheel encourages the driver to direct his/her gaze toward the central viewing region $B_1$ with the steering wheel and the traffic situation ahead.

The dependence of the dimmed light intensity $I_2$ on the driver's gaze is indicated by the vertically extending arrow bearing the reference sign B in FIG. 2.

During the time $t_3$ to $t_4$, the dimmed light intensity $I_2$ can vary over time t in the event of change in the influencing factors H, A, B.

At the point in time $t_4$, in connection with a takeover request, the light intensity I is increased again, for example because it has been established that the vehicle has approached an end point ahead for automated driving HAD such that a specific proximity condition is met. If it has been established at the point in time $t_5$ that the driver has taken over the task of driver, the light intensity I is reduced, in particular the luminous strips 2a, 2b are deactivated. If instead the driver does not take over the task of driver, the light intensity still remains at a high level and the luminous color preferably changes from blue (optionally via one or more intermediate colors) to red.

It is assumed that before the point in time $t_1$ the vehicle is being controlled manually by the driver and the luminous strips 2a, 2b are therefore deactivated. At the point in time $t_1$, the driver is made aware of the availability of the driving mode HAD for activation by virtue of the luminous strips 2a, 2b being activated and emitting light in blue with the light intensity $I_1$ for a short duration. If the driver does not accept this offer to activate the driving mode HAD, the luminous strips 2a, 2b are deactivated again.

Besides the automatic adaptation of the dimmed light intensity $I_2$ depending on the influencing factors H, A, B, provision can be made for the dimmed light intensity $I_2$ to be settable manually by way of an operating element.

It is advantageous if after the activation of the driving mode HAD during the dimming of the light intensity I the decrease in the light intensity I to the light intensity $I_2$ of the dimmed luminous state takes an identical length of time in the case of a varying light intensity $I_2$ of the dimmed luminous state.

During the dimming of the light intensity I, the time duration for the change of the light intensity I is thus preferably independent of the decrease swing and thus independent of the variable target level $I_2$ of the dimmed light intensity, that is to say that in the case of a higher value for $I_2$ the dimming takes just as long as in the case of a lower value for $I_2$ with respect thereto. As a rule, the process of dimming always appears the same to the user and is easy to assign as such.

In this exemplary embodiment, the upper level $I_1$ of the light intensity is also variable and dependent on the influencing factors H, A, B. By way of example the upper level $I_1$ of the light intensity I increases in the case of increasing ambient brightness.

Figure 5:
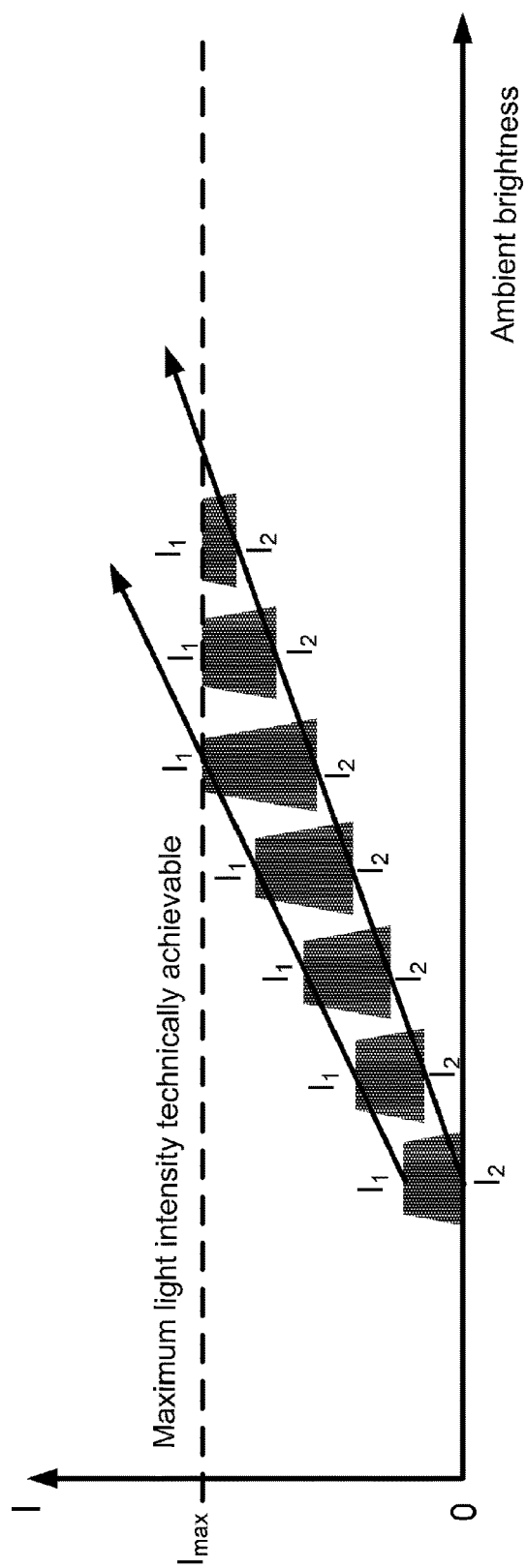
FIG. 5 shows an exemplary dependence of the levels $I_1$ and $I_2$ of the light intensity I.

FIG. 5 illustrates an exemplary dependence of the level $I_2$ of the dimmed light intensity and of the upper level $I_1$ of the light intensity I on the ambient brightness. The range between the respective values for $I_1$ and $I_2$ for the same ambient brightness corresponds to the swing of the light intensity I. In order to ensure a good recognizability of the light signal as ambient brightness rises, the brightness increases with increasing ambient brightness, that is to say that the values for $I_1$ and $I_2$ rise. In the example in FIG. 5, with increasing ambient brightness, the upper level $I_1$ of the light intensity increases to a greater extent than the dimmed level $I_2$ of the light intensity. This is the case, for example, if the dimmed level $I_2$ is doubled in order to attain the upper level $I_1$. This results in a trend toward a higher swing in the case of higher ambient brightness than in the case of lower ambient brightness with respect thereto, as long as the upper level $I_1$ is not limited by the maximum light intensity $I_{max}$ technically achievable. As a result, the change in the luminous intensity from $I_1$ to $I_2$ or vice versa can be perceived better in the case of higher ambient brightness. If the upper level $I_1$ is limited by the maximum light intensity $I_{max}$ technically achievable, the swing decreases again despite a larger swing being required.

Figure 4:
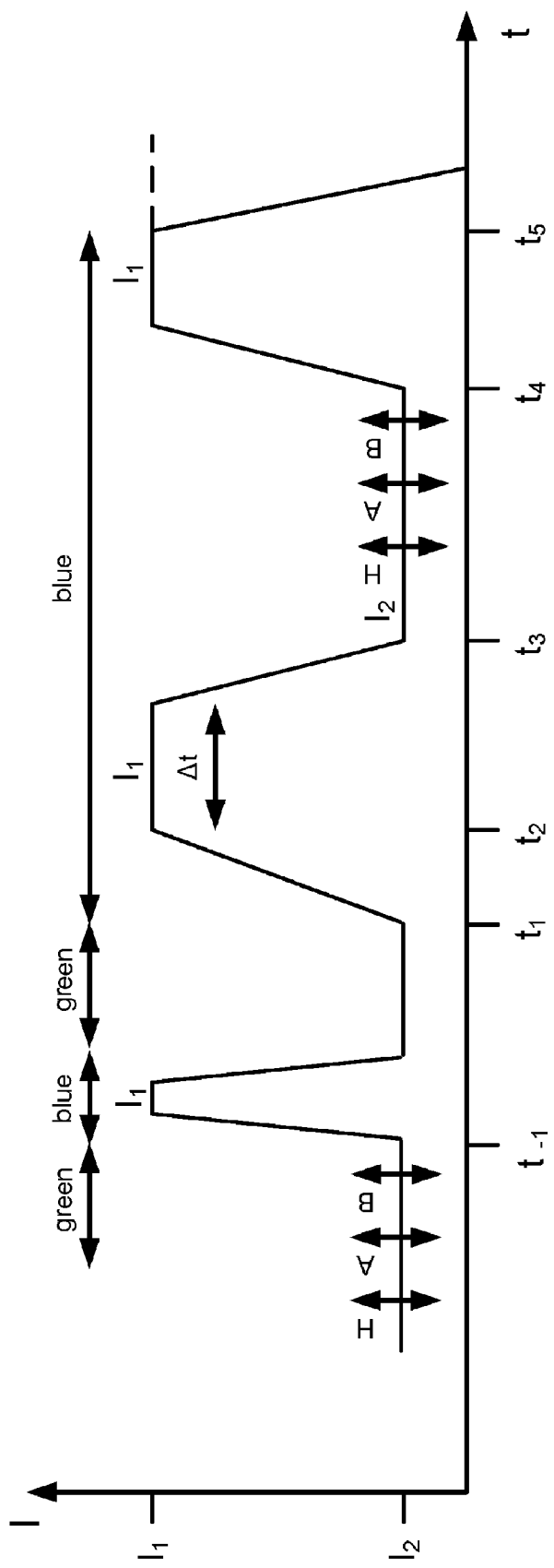
FIG. 4 shows an exemplary schematically depicted profile of the light intensity of the luminous strips of the steering wheel display over time.

FIG. 4 shows an alternative exemplary profile to FIG. 2 of the light intensity I of the luminous strips 2a, 2b of the steering wheel display over time t. In contrast to FIG. 2, it is assumed that before the activation of the automated driving mode HAD, the driving system is being operated in a driving mode with lower automation, here for example in the partly automated mode PAD with automated longitudinal and lateral control. Therefore, the luminous strips 2a, 2b emit light in the luminous color green assigned to the driving mode PAD. Instead of the driving mode PAD, the driving mode ACC could also be present before the activation of the driving mode HAD, the luminous strips 2a, 2b then emitting light in the luminous color (e.g. yellow) assigned to the driving mode ACC.

As described in connection with the automated driving mode HAD in FIG. 2, analogously shortly after the activation of the driving mode PAD the light intensity I of the luminous strips 2a, 2b emitting light in green was dimmed to the dimmed light intensity $I_2$ (not illustrated). In this case, the dimmed light intensity $I_2$ during operation in the driving mode PAD is dependent on the influencing factors H, A, B, as was explained with regard to the driving mode HAD.

At the point in time $t_{-1}$, the driver is made aware of the availability of the driving mode HAD for activation by virtue of the light intensity I of the luminous strips 2a, 2b being increased and being luminous with the increased light intensity $I_1$ for a short duration. Furthermore, with the increase in the light intensity I, the luminous color is briefly switched over to the luminous color (here: blue) assigned to the driving mode. If the driver does not activate the driving mode HAD, the luminous color changes back again to the original luminous color (here green), the light intensity decreasing again to the dimmed light intensity $I_2$.

Given availability of the driving mode HAD, thus—in addition to the increase in the light intensity I—the luminous color is changed to the luminous color assigned to the driving mode HAD and then the change in the luminous color is reversed again. Alternatively, it will be conceivable, upon the availability of the driving mode HAD being attained, merely to increase the luminous intensity of the current color (here: green) momentarily in order to signal the availability of the driving mode HAD. In accordance with a third alternative, upon availability of the driving mode HAD, momentarily one portion of the illuminants could emits light in the luminous color (here: blue) assigned to the driving mode HAD, while another portion of the illuminants emits light in the luminous color assigned to the current driving mode (here: green).

What is claimed is:

1. A display device for a driving system for automated driving of a motor vehicle, wherein for the automated driving the driving system is operable at least in an automated driving mode with automated longitudinal and/or lateral control, comprising:
a driving mode display comprising an illuminant for a vehicle cockpit; and
a control device coupled to the driving mode display, wherein the control device is configured to:
control the driving mode display such that in a context of activating the automated driving mode, the illuminant is luminous in a first luminous state with a specific light intensity in order to indicate the activation of the automated driving mode to a driver,
control the driving mode display such that after the activation of the automated driving mode, with the automated driving mode still active, the illuminant is operated in a dimmed luminous state in comparison with the first luminous state, with a reduced light intensity relative to the light intensity of the first luminous state,
receive brightness information indicative of an ambient brightness, and
control the illuminant depending on the brightness information such that a swing between the light intensity of the first luminous state and the light intensity of the dimmed luminous state is larger for a higher ambient brightness than for a lower ambient brightness relative thereto.

2. The display device according to claim 1, wherein the control device is further configured to:
dim the light intensity after a predefined time duration has elapsed.

3. The display device according to claim 1, wherein the illuminant comprises a luminous strip of light-emitting devices; and
the driving mode display is a steering wheel display comprising the luminous strip disposed on or within a rim of the steering wheel.

4. The display device according to claim 1, wherein the light intensity of the dimmed luminous state is variable,
the control device is further configured to:
receive gaze information about where a driver's gaze is directed, and
control the illuminant depending on the gaze information, wherein
the light intensity of the dimmed luminous state is dependent on the gaze information.

5. The display device according to claim 4, wherein the illuminant comprises a luminous strip of light-emitting devices;
the driving mode display is a steering wheel display comprising the luminous strip disposed on or within a rim of the steering wheel, and
the control device is further configured to:
control the steering wheel display depending on the gaze information such that the light intensity of the dimmed luminous state is lower when the driver's gaze is directed toward the steering wheel compared to when the driver's gaze is directed toward viewing points remote from the steering wheel.

6. The display device according to claim 5, wherein a field of view includes a plurality of defined viewing regions comprising:
a first viewing region comprising at least the steering wheel, and
a second viewing region at least partly surrounding the first viewing region, and
the control device is further configured to:
control the steering wheel display depending on the gaze information such that the light intensity of the dimmed luminous state is lower when the driver's gaze is directed toward the first viewing region compared with when the driver's gaze is directed toward the second viewing region.

7. The display device according to claim 1, wherein the light intensity of the dimmed luminous state is variable,
the control device is further configured to:
receive activity information about the driver's activity, and
control the illuminant depending on the activity information, wherein the light intensity of the dimmed luminous state is dependent on the activity information.

8. The display device according to claim 7, wherein the activity information comprises information about whether the driver is viewing a screen situated in the vehicle.

9. The display device according to claim 1, wherein the light intensity of the dimmed luminous state is variable, and
the control device is further configured to:
control the illuminant depending on the brightness information such that the light intensity of the dimmed luminous state is higher for increased brightness than for lower brightness relative to the increased brightness.

10. The display device according to claim 1, wherein the light intensity of the dimmed luminous state is variable, and
the reduction in the light intensity to the light intensity of the dimmed luminous state takes an identical length of time when a varying light intensity of the dimmed luminous state.

11. The display device according to claim 1, wherein the control device is further configured to:
   control the driving mode display such that in connection with a current or imminent takeover request for taking over the automated driving, the light intensity of the illuminant is increased.

12. The display device according to claim 1, wherein the control device is further configured to:
   control the driving mode display such that in reaction to the automated driving being taken over by the driver, the light intensity of the illuminant is reduced to the light intensity of the dimmed luminous state.

13. The display device according to claim 1, wherein the control device is further configured to:
   control the driving mode display such that before the activation of an automated driving mode in reaction to ascertaining an availability of this driving mode for activation by the driver:
      (i) the light intensity of the illuminant is increased, if the illuminant is already luminous beforehand, or
      (ii) the illuminant is activated if the illuminant is not luminous beforehand.

14. The display device according to claim 1, wherein the control device is further configured to:
   control the driving mode display such that the light intensity of the illuminant is increased upon at least one of the following events being ascertained:
      (i) fatigue of the driver; or
      (ii) presence of a takeover desire of the driver.

15. A driving system, comprising a display device according to claim 1.

16. A display method for displaying an activated automated driving mode for a driving system for automated driving of a motor vehicle, wherein, for automated driving, the driving system is operable at least in an automated driving mode with automated longitudinal and/or lateral control, and a driving mode display for cockpit of the motor vehicle with a illuminant is present, comprising the steps of:
   controlling the driving mode display such that in a context of activating the automated driving mode, the illuminant is luminous in a first luminous state with a specific light intensity in order to indicate the activation of the automated driving mode to a driver;
   after the activation of the automated driving mode, controlling the driving mode display such that, with the first driving mode still active, the illuminant is operated in a dimmed luminous state in comparison with the first luminous state, with a reduced light intensity relative to the light intensity of the first luminous state,
   receiving brightness information indicative of an ambient brightness, and
   controlling the illuminant depending on the brightness information such that a swing between the light intensity of the first luminous state and the light intensity of the dimmed luminous state is larger for a higher ambient brightness than for a lower ambient brightness relative thereto.

17. The method according to claim 16, further comprising:
   controlling the driving mode display such that in connection with a current or imminent takeover request for taking over the automated driving, the light intensity of the illuminant is increased.

18. The method according to claim 16, further comprising:
   controlling the driving mode display such that in reaction to the automated driving being taken over by the driver, the light intensity of the illuminant is reduced to the light intensity of the dimmed luminous state.

19. A display device for a driving system for automated driving of a motor vehicle, wherein for the automated driving the driving system is operable at least in an automated driving mode with automated longitudinal and/or lateral control, comprising:
   a driving mode display comprising an illuminant for a vehicle cockpit; and
   a control device coupled to the driving mode display, wherein the control device is configured to:
      control the driving mode display such that in a context of activating the automated driving mode, the illuminant is luminous in a first luminous state with a specific light intensity in order to indicate the activation of the automated driving mode to a driver,
      control the driving mode display such that after the activation of the automated driving mode, with the automated driving mode still active, the illuminant is operated in a dimmed luminous state in comparison with the first luminous state, with a reduced light intensity relative to the light intensity of the first luminous state, and
      control the driving mode display such that before the activation of an automated driving mode in reaction to ascertaining an availability of this driving mode for activation by the driver:
         (i) the light intensity of the illuminant is increased, if the illuminant is already luminous beforehand, or
         (ii) the illuminant is activated if the illuminant is not luminous beforehand.

20. A display method for displaying an activated automated driving mode for a driving system for automated driving of a motor vehicle, wherein, for automated driving, the driving system is operable at least in an automated driving mode with automated longitudinal and/or lateral control, and a driving mode display for cockpit of the motor vehicle with a illuminant is present, comprising the steps of:
   controlling the driving mode display such that in a context of activating the automated driving mode, the illuminant is luminous in a first luminous state with a specific light intensity in order to indicate the activation of the automated driving mode to a driver;
   after the activation of the automated driving mode, controlling the driving mode display such that, with the first driving mode still active, the illuminant is operated in a dimmed luminous state in comparison with the first luminous state, with a reduced light intensity relative to the light intensity of the first luminous state, and
   controlling the driving mode display such that before the activation of an automated driving mode in reaction to ascertaining an availability of this driving mode for activation by the driver:
      (i) the light intensity of the illuminant is increased, if the illuminant is already luminous beforehand, or
      (ii) the illuminant is activated if the illuminant is not luminous beforehand.

* * * * *